United States Patent

Mize et al.

[15] 3,638,911

[45] Feb. 1, 1972

[54] ASPHALT PLANT ERECTOR

[72] Inventors: Erbie G. Mize; James D. Brock, both of Chattanooga, Tenn.

[73] Assignee: CMI Corporation, Oklahoma City, Okla.

[22] Filed: Feb. 6, 1970

[21] Appl. No.: 9,171

[52] U.S. Cl. ....................254/89 R
[51] Int. Cl. ....................B66f 7/12
[58] Field of Search ....................214/2, 6.2, 505, 46; 254/105–107, 4, 7, 89; 52/122, 745, 749, 143; 187/9

[56] References Cited

UNITED STATES PATENTS

| | | | |
|---|---|---|---|
| 289,119 | 11/1883 | Metzger | 52/115 |
| 2,386,494 | 10/1945 | Nagel | 52/122 |
| 2,609,111 | 9/1952 | Daves | 214/6.2 |
| 2,578,631 | 12/1951 | Howard-Smith | 52/122 |
| 2,708,012 | 5/1955 | Talcott | 52/122 |
| 2,862,252 | 12/1958 | Beach | 52/122 |
| 2,972,426 | 2/1961 | Sanford | 214/505 |
| 2,975,884 | 3/1961 | Kayser | 214/2 |
| 3,266,211 | 8/1966 | Hughes | 52/122 |
| 3,546,831 | 12/1970 | Romo | 52/749 |

*Primary Examiner*—Othell M. Simpson
*Attorney*—Jones & Thomas

[57] ABSTRACT

An erector system and apparatus for erecting sectional asphalt plants, or the like. A wheeled support frame is positioned at the plant site and lowered into contact with the ground surface. Four support legs are moved from inclined traveling positions on the framework to upright spaced rectangular positions. A pair of parallel horizontal lifting beams are connected at their ends to the lower ends of the support legs. A series of wheeled plant sections are sequentially moved laterally across the framework across the lifting beams and the lifting beams and the plant sections are sequentially raised to the upper ends of the support legs to support the lowermost plant section. The process is repeated until all of the plant sections have been assembled and raised whereupon plant support legs are positioned beneath the lowermost plant section and the assembly is lowered to rest upon the plant support legs. The framework support legs are then lowered to their inclined positions, the framework raised back onto its wheels, and the framework and its related apparatus is then moved from beneath the assembled plant.

7 Claims, 9 Drawing Figures

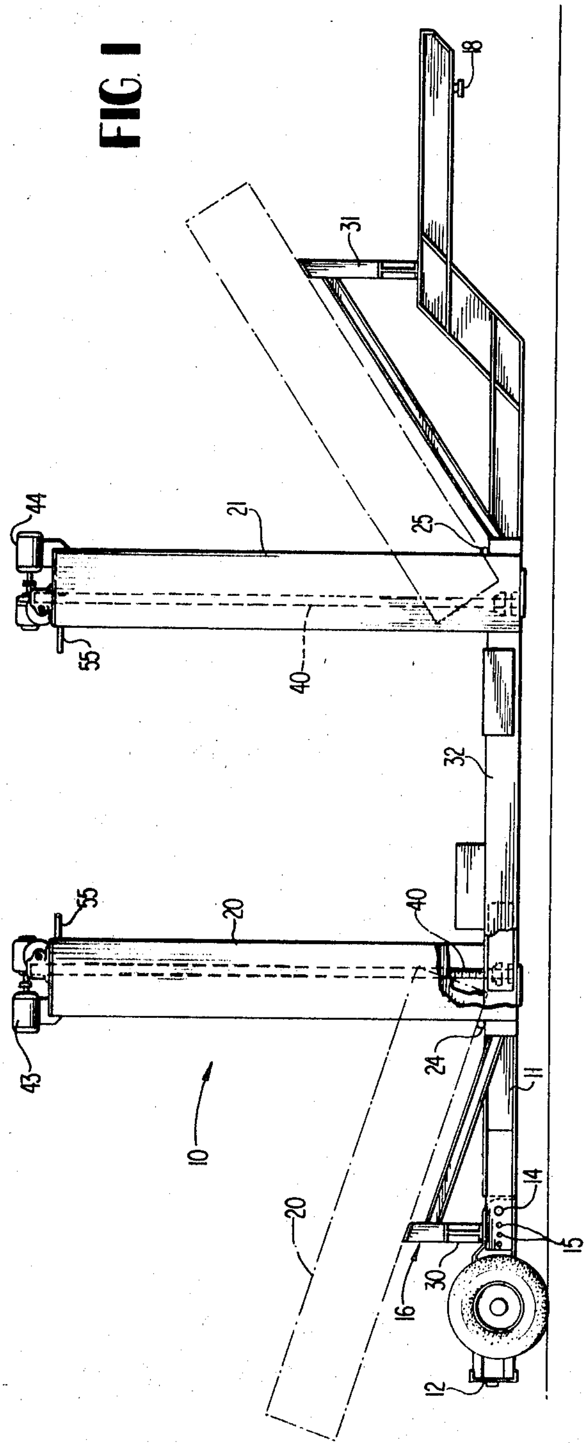
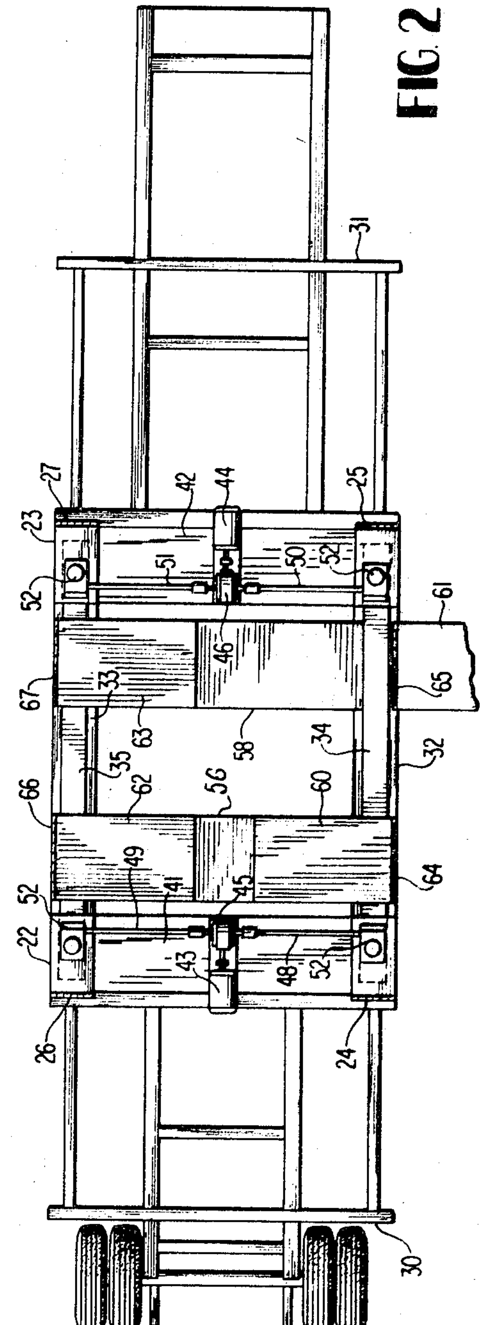
INVENTORS
JAMES D. BROCK
ERBIE G. MIZE
BY
Jones & Thomas
ATTORNEYS 70
76
71
72
82
81
80
73
84
83
78
74
79
86
85
75
75
76
76

ASPHALT PLANT ERECTOR

BACKGROUND OF THE INVENTION

When constructing asphalt roads, or the like, it is desirable to produce the asphalt mix at a plant site which is a short distance from the road construction site so that only a minimum travel distance is required by the trucks or similar vehicles transporting the mix from the plant to the construction site. Under the usual circumstances the distance through which the mix must be transported from the plant site to the construction varies as the construction progresses.

The typical asphalt plant comprises a number or large devices that are difficult to assemble, disassemble and transport. One of the more difficult portions of an asphalt plant to assemble and disassemble is the grading, weighing and mixing assembly which has its components vertically oriented and elevated so that trucks can be driven beneath the assembly and the mix can be dispensed into the trucks. The extreme height, the large size and the weight of the plant assembly and its components are such as to make the assembly and disassembly of the sectional plant onerous and time consuming. Under normal circumstances, it may require a month to dismantle, relocate and reassemble the more portable prior art asphalt plants. Moreover, once the prior art plants have been dismantled, they are cumbersome and inconvenient to transport over existing highways.

Because of the difficulty and time required in relocating an asphalt plant, the operators of such plants have been inclined to have the asphalt mix transported over longer and longer distances from the plant site to the construction site to avoid relocating the plant site close to the construction site. Of course, this results in slower delivery of the mix to the construction site or in more trucks being required to transport the mix in order to maintain proper delivery rate of the mix. In either case, the expense to the contractor, and ultimately to the taxpayer, is increased.

SUMMARY OF THE INVENTION

Briefly described, the present invention comprises an asphalt plant erector and system of erection wherein the plant sections are mounted on wheels and can be towed between plant sites. The large vertical grading, weighing, mixing and dispensing plant assembly is also divided into wheel mounted sections and a wheel mounted framework is provided and functions to rapidly assemble and raise these sections, or lower and disassemble these sections.

Thus, it is an object of the invention to provide an asphalt plant erector which functions to rapidly erect or dismantle an asphalt plant.

Another object of this invention is to provide a trailer which can be separately towed between various asphalt plant sites and utilized to assemble or disassemble a sectional raised asphalt plant.

Another object of this invention is to provide a system for rapidly and economically dismantling, transporting and assembling sectional asphalt plants.

Other objects, features and advantages of the present invention will become apparent upon reading the following specification when taken into conjunction with the accompanying drawing.

BRIEF DESCRIPTION OF THE DRAWING

FIG. 1 is side elevational view of the asphalt plant erector.

FIG. 2 is plan view of the asphalt plant erector.

DESCRIPTION OF THE PREFERRED EMBODIMENTS

Figure 3:
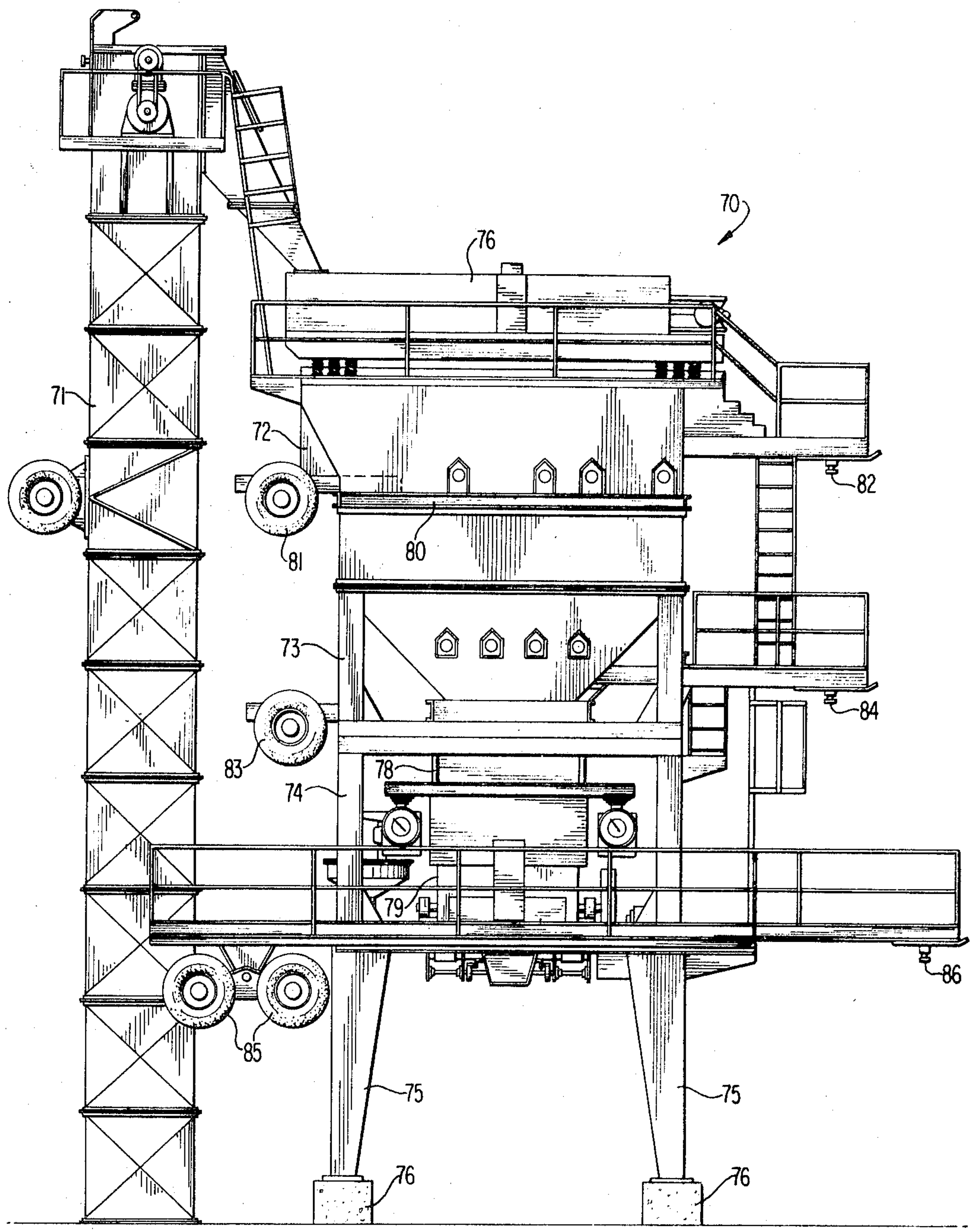
FIG. 3 is a side elevational view of an assembled asphalt plant.
Figure 5:
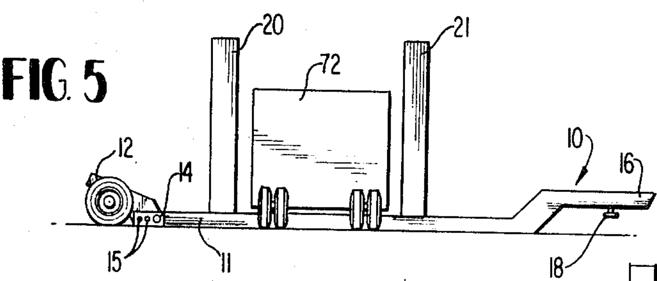
FIGS. 5,6,7,8, and 9 are schematic sequential illustrations of the manner in which an asphalt plant is assembled by the use of the asphalt plant erector.
Figure 6:
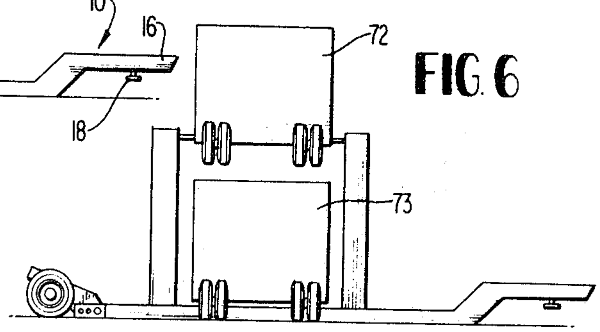
Figure 7:
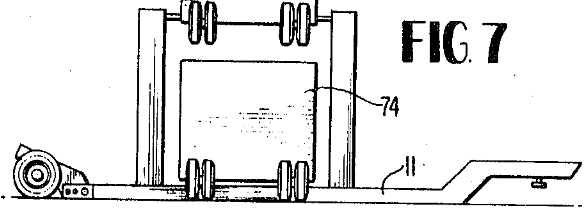
Figure 8:
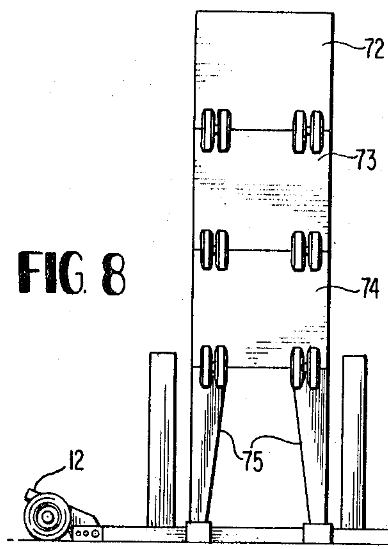

Referring now in more detail to the drawing, in which like numerals indicate like parts throughout several views, FIG. 1 and 2 show asphalt plant erector 10 which includes a generally laterally extending elongated main framework 11 and wheel framework 12 that are connected together by pivot pins 14 and connector pins 15 to form a trailer assembly 16. The front end of the trailer assembly 16 includes kingpin 18 which is connectable to a tractor. When the trailer assembly 16 is in the position as shown in FIG. 1 with a tractor connected to kingpin 18, it can be towed over a road surface, and when the tractor has been disconnected from the kingpin and the connector pins 15 have been removed, the wheel framework 12 will pivot about pivot pin 14 to allow main framework 11 to lie flat on the ground surface.

Four framework support legs or section columns 20,21, 22 and 23 (FIG. 2) are connected to main framework 11 at their lower ends and are positioned in a rectangular arrangement with respect to each other. Hinges 24,25,26 and 27 are connected between the respective erection columns 20–23 and main framework 11 at positions to enable the erection columns to pivot with respect to main framework 11 between upright positions (the solid line positions of FIG. 1) to laterally extending or inclined traveling positions (the broken-line positions of FIG. 1). The arrangement is such that the rear framework support legs 20 and 22 pivot parallel to the centerline of trailer assembly 16 toward the rear of the trailer assembly while the forward support legs 21 and 23 pivot in a forward direction parallel to the center line of the trailer assembly. Erection column supports 30 and 31 are located at the rear and forward portions of main framework 11 and arranged to support the erection columns in their inclined attitudes.

Figure 4:
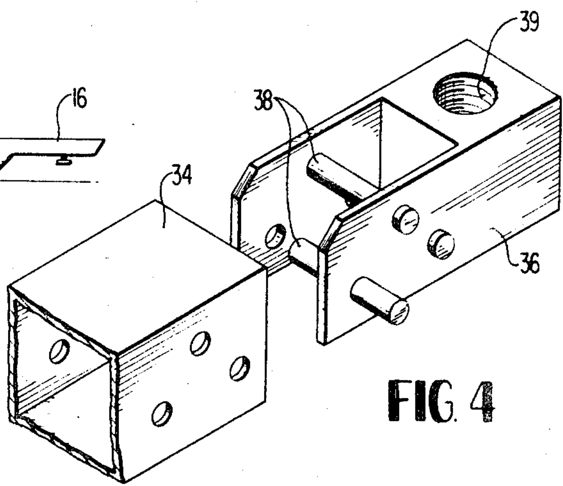
FIG. 4 is a detailed illustration of the end of a lifting beam and its connector in spaced relationship.

As is best shown in FIG. 2, erection columns 20–23 are channel shaped, and the openings of columns 20 and 21 face each other while the openings of columns 22 and 23 face each other. Horizontal framework members 32 and 33 support and extend between erection columns 20 and 21 and 22 and 23, respectively. Framework members 32 and 33 are also channel shaped and their openings extend in an upward direction. Lifting beams 34 and 35 are normally carried in the channel of framework members 32 and 33, respectively. As is best illustrated in FIG. 4, each lifting beam 34 and 35 includes two connectors 36 that are attached to the ends of the lifting beam by means of a plurality of connecting pins 38 which extend through aligned openings in the connector and its lifting beam. A threaded vertical opening 39 is defined in each connector 36.

A worm gear 40 is rotatedly positioned in each erection column 20–23 and is movable with its column between the inclined position and the upright position of the column. A connector 36 (FIG. 4) is connected to each worm gear 40 by having its threaded vertical opening 39 extending about the worm gear. Thus, when the worm gears 40 are rotated their respective connectors 36 will be moved along the lengths of the worm gears. When each erection column 20–23 is oriented in its upright attitude, the connectors 36 of each worm gear 40 will be connected to the ends of lifting beams 34 and 35 by inserting connecting pins 38 through the aligned openings of the connectors 36 and the ends of lifting beams 34 and 35. Thus, when worm gears 40 are rotated to move the connectors vertically with respect to the erection beams, the lifting beams 34 and 35 will also move in a vertical direction.

As is best illustrated in FIG. 1 and 2, support platforms 41 and 42 extend between the upper ends of erection columns 20 and 22 and 21 and 23, respectively. Motors 43 and 44 and gearboxes 45 and 46 are located on support platforms 41 and 42. Drive shafts 48 and 49 extend from gearbox 45 and drive worm gears 40 of the erection columns 20 and 22 through a worm gear connection 52 at the top of worm gears 40, while drive shafts 50 and 51 extend from gearbox 46 and drive worm gears 40 of erection columns 21 and 23 through worm gear connectors 52.

With this arrangement, the connectors 36 of lifting beams 34 and 35 that are connected to the worm gears 40 of erection columns 20 and 22 will be driven by motor 43 while connectors 36 of erection columns 21 and 23 will be driven by motor 44.

A support pin 55 is located at the upper end of each of the erection columns 20–23. Support pins 55 are arranged to reciprocate or move along their lengths to project from the erection columns inwardly within the space between the erection columns.

A pair of tracks 56 and 58 extend laterally across the centerline of the main framework between framework members 32 and 33, and ramps 60,61,62, and 63 are pivotally connected to the outside upper edge of framework members 32 and 33 by means of hinges 64,65,66 and 67 in such a manner that the ramps can be pivoted from an extended position as shown by the position of ramp 61 in FIG. 2 to a folded or traveling position as illustrated by ramps 60,62 and 63. The ramps are aligned with tracks 56 and 58, and when the ramps are folded out and extended a wheeled vehicle can be driven from the ground surface up the ramps and over the tracks and lifting beams 34 and 35.

As is best illustrated in FIG. 3, the asphalt plant 70 that is usable with the plant erector 10, comprises an elevator 71, bin top section 72, bin bottom section 73, mixer section 74, and support legs 75. Bin top section 72 includes grader 76, which receives the dried rocks from elevator 71 and separates the rocks in predetermined sizes and allows the rocks to fall into one of the bins of top bin section 72. From this point, the graded rock is allowed to fall to the bottom bin section where it is stored and available for dispensing to mixer section 74. Mixer section 74 comprises a weigher 78 and a pug mill 79. These elements are of conventional construction and well known in the art.

Upper bin section is mounted upon a frame 80 that has wheels 81 at one end and a kingpin 82 at its other end so that the entire section 72 can be transported as a trailer vehicle. Bottom bin section 73 and mixer section 74 are constructed in a similar manner in that they include a frame and wheels 83 and 85 and kingpins 84 and 86. While the general components of the sections that comprise the asphalt plant 70 vary in accordance to their functions, they all include a frame, wheels, and king pins for easy transportation. Moreover, their frames are constructed so that the mixer section supports the bin bottom section, while the bin bottom section supports the bin top section.

OPERATION

As is best shown in the sequence of FIGS. 5,6, 7 and 8, the asphalt plant erector 10 is transported to the site at which the asphalt plant is to be erected, and the connector pins 15 are removed to allow the wheel framework 12 to pivot about pivot pins 14 and allow the framework 11 to rest flat upon the ground surface. Ramps 60,61,62 and 63 are pivoted about their hinges 64, 65, 66 and 67 from their folded travel positions upon main framework 11 to their extended positions to the side of trailer assembly 16 so as to form an extension of tracks 56 and 58. Erection columns 20–23 are moved from their inclined positions (FIG. 1) to their upright positions and connectors 36 (FIG. 4) are connected to the ends of lifting beams 34 and 35 (FIG. 2) by inserting the connecting pins 38 through the aligned openings in connectors 36 and the ends their respective lifting beams 34 and 35. When trailer assembly 16 has been placed in this configuration, it is ready to begin the assembly of the asphalt plant.

Top bin section 72 is then moved across main framework 11, over ramps 60–63 and tracks 56 and 58 until the top bin section is properly oriented with respect to erection columns 20–23 and lifting beams 34 and 35. The arrangement is such that the longitudinal centerline of top bin section is oriented at a right angle with respect to the longitudinal centerline of trailer assembly 16, so that the ends of top bin section 72 extend substantially beyond the sides of trailer assembly 16. Motors 43 and 44 are then energized to lift lifting beams 34 and 35 by the rotation of worm gears 40 within the confines of erection columns 20–23. As lifting beams 34 and 35 move in an upward direction, they engage the bottom surface of top bin section 62 and lift the top bin section in an upward direction. When the lower portion of top bin section 72 reaches the proximity of the upper ends of erection columns 20–23, support pins 55 are extended from erection columns 20–23 out beneath top bin section 72, and motors 43 and 44 are reversed to lower lifting beams 34 and 35. Top bin section 72 will then rest upon support pins 55 and lifting beams 34 and 35 will move in a downward direction back into the confines of the channel of framework members 32 and 33 at the lower portion of main framework 11. The elevation of top bin section 72 will be sufficient to allow bottom bin section 73 to move across main framework assembly 11 to its proper position beneath to p bin section 72.

When the bottom bin section is properly positioned beneath the top bin section, motors 43 and 44 are again energized to lift lifting beams 34 and 35 into engagement with the lower portion of bottom bin section 73, and lift bottom bin section 73 up into engagement with the lower portion of top bin section 72. When the strain is taken off support pins 55, they are retracted into the confines of erection columns 20–23 and lifting beams 34 and 35 are then moved further in an upward direction until the lower portion of bottom bin section 73 is in the proximity of the upper ends of erection columns 20–23, whereupon support pins 55 are again moved out from the confines of erection columns 20–23 beneath bottom bin section 73. Lifting beams 34 and 35 are then moved in a downward direction to allow both top bin section 72 and bottom bin section 73 to rest upon support pins 55, while the lifting beams move down to retrieve mixer section 74. Mixer section 74 is elevated in a similar manner until its lower portion is in the proximity of the upper ends of direction columns 20–23. Plant support legs 75 and piers 76 are then placed beneath mixer section 74 by the use of a front loader, crane, or similar vehicle. When plant legs 75 are properly positioned, lifting beams 34 and 35 are allowed to move in a downward direction to rest the assembled plant sections upon the plant legs. At this point, the three sections of the asphalt plant are properly assembled.

Figure 9:
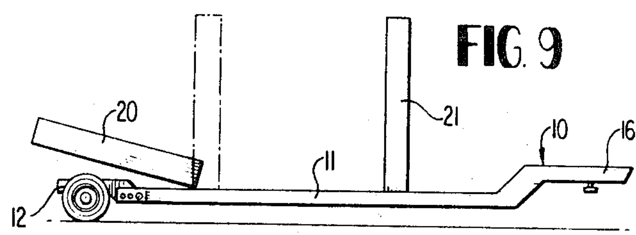

In order to use plant erector 10 for the erection or disassembly of other plants and to remove the plant erector from the site of the plant, connecting pins 38 of the connectors 36 (FIG. 4) are removed to disconnect the connectors 36 from the ends of lifting beams 34, and erection columns 20–23 are moved from their upright positions to their inclined traveling positions (FIG. 9). Main framework 11 of trailer assembly 16 is elevated by a crane or jack so that wheel framework 12 pivots back into alignment with main framework 11. Connector pins 15 are reinserted in the aligned openings of main framework 11 and wheel framework 12 to rigidly connect these elements together and a tractor is connected to kingpin 18. The trailer assembly 16 is then moved from beneath the assembled asphalt plant. This allows the space between the plant legs 75 and beneath the pug mill 79 to be free to receive trucks so that the asphalt mix prepared by the plant can be dispensed to the trucks.

The remaining equipment (not shown) that is used with asphalt plant 70 is also wheel mounted and can be towed between plant sites when the plant is being relocated.

When asphalt plant 70 is to be disassembled, asphalt plant erector 10 is repositioned beneath mixer section 74 and the sections of the plant are disassembled in a reverse procedure. As each section is removed from the plant site, it can be towed to the next plant site.

The plant sections, trailer assembly and the other equipment not shown in the drawing have been constructed with width and height dimensions that are permitted on the highways, and since the trailer assembly is oriented at a right angle with respect to the plant sections when assembling the sections, the trailer does not have to be wider than the width of the plant sections. Thus, all the plant sections can be constructed with maximum highway width and height dimensions.

While this invention has been described in combination with asphalt plants, it should be understood that it can be used with various other combinations and that variations and modifications can be effected within the spirit and scope of the invention as described hereinbefore and as defined in the appended claims.

We claim:

1. A plant erector for assembling sectional asphalt plants or the like comprising a portable elongated generally laterally extending support frame, four erection columns arranged in rectangular relationship with respect to each other with two erection columns at one side of said support frame and two erection columns at the other side of said support frame with the erection columns connected at their lower ends to said support frame and pivotal through parallel planes between inclined positions and upright positions on said support frame, a pair of laterally extending lifting beams extending along the length of said support frame and between the erection columns at the sides of the support frame, means for connecting said lifting beams at their ends to said erection columns when said erection columns are upright, and means for moving said lifting beams up and down said erection columns when said erection columns are upright.

2. The invention of claim 1 and wherein said support frame comprises a trailer assembly having a kingpin connector at one end and a wheel assembly at its other end, said wheel assembly being constructed and arranged to lower said frame onto the ground surface or the like.

3. The invention of claim 1 and further including ramp members pivotally connected to both sides of said support frame and each moveable between a position resting upon said support frame to a position extending outwardly to the sides of the support frame.

4. The plant erector of claim 1 and wherein said means for moving said lifting beams up and down said erection columns comprises a worm gear member extending along each erection column and means for rotating said worm gear members.

5. The plant erector of claim 1 and further including support pins at the upper end of each erection column and moveable to positions projecting inwardly between said erection columns.

6. The plant erector of claim 1 and wherein the portions of said framework extending along the length of said framework between the lower ends of said erection columns are channel shaped in cross section with their openings facing upwardly, and wherein said lifting beams are movable into and out of the openings of said channel-shaped portions of said framework as said lifting beams are moved down or up the upright erection columns.

7. Apparatus for erecting a sectional asphalt plant or the like comprising a trailer assembly including a support frame with a support wheel assembly at one end and a king pin member at the other end, said support wheel assembly being pivotally connected to said support frame about a horizontal axis to lower said support frame onto the ground surface or the like, a first pair of support legs hingedly connected at their lower ends to said support frame and moveable between upright positions to positions inclined toward one end of said trailer assembly, a second pair of support legs hingedly connected at their lower ends to said support frame and moveable between upright positions and positions inclined toward the other end of said trailer assembly, a lifting mechanism connected to and moveable with each of said support legs, and a pair of lifting beams extending horizontally along the length of said support frame between the support legs of said first and second pairs of support legs, said lifting beams being connectable at their ends to said lifting mechanisms when said support legs are in their upright positions.

* * * * *